United States Patent [19]

Takita et al.

[11] Patent Number: 4,741,960
[45] Date of Patent: May 3, 1988

[54] MAGNETIC RECORDING MEDIUM HAVING A BACK COAT LAYER CONTAINING A SPECIFIC TYPE OF LUBRICANT

[75] Inventors: Hitoshi Takita; Nobuo Ishikawa; Shigeru Nakano, all of Mito, Japan

[73] Assignee: Victor Company of Japan, Ltd., Japan

[21] Appl. No.: 10,957

[22] Filed: Feb. 2, 1987

[30] Foreign Application Priority Data

Feb. 5, 1986 [JP] Japan ................................ 61-22165

[51] Int. Cl.$^4$ .............................................. G11B 5/70
[52] U.S. Cl. .................................... 428/336; 427/128; 427/131; 428/425.9; 428/694; 428/695; 428/900; 428/447; 428/480
[58] Field of Search ............ 428/695, 694, 447, 425.9, 428/900, 480, 336; 427/131, 132, 128; 360/134–136

[56] References Cited

U.S. PATENT DOCUMENTS

| | | | |
|---|---|---|---|
| 4,007,313 | 2/1977 | Higuchi | 428/447 |
| 4,007,314 | 2/1977 | Higuchi | 428/447 |
| 4,110,503 | 8/1978 | Ogawa | 428/695 |
| 4,171,406 | 10/1979 | Yamaguchi | 428/695 |
| 4,349,608 | 9/1982 | Shimizu | 428/695 |
| 4,431,703 | 2/1984 | Somezawa | 428/695 |
| 4,469,750 | 9/1984 | Fujiki | 428/447 |
| 4,469,751 | 9/1984 | Kobayashi | 428/447 |
| 4,501,800 | 2/1985 | Fujiki | 428/447 |
| 4,501,801 | 2/1985 | Kimura | 428/447 |
| 4,529,659 | 7/1985 | Hoshino et al. | 428/695 |

FOREIGN PATENT DOCUMENTS

| | | |
|---|---|---|
| 3440361 | 2/1987 | Fed. Rep. of Germany . |
| 52-73703 | 6/1977 | Japan . |
| 58-41420 | 3/1983 | Japan . |
| 59-5428 | 1/1984 | Japan . |

*Primary Examiner*—Ellis P. Robinson
*Attorney, Agent, or Firm*—Lowe, Price, LeBlanc, Becker & Shur

[57] ABSTRACT

A magnetic recording medium comprising a back coat layer formed on a non-magnetic support on one side which is opposite to a side where a magnetic recording layer is formed. The back coat layer is made of a dispersion of a fluorine-modified organosiloxane in a binder resin. The organosiloxane is of the following formula

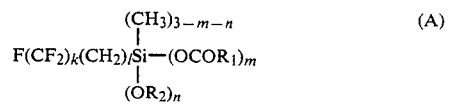

in which $R_1$ represents a saturated or unsaturated monohydrocarbon group having from 7 to 21 carbon atoms, $R_2$ represents a saturated monohydrocarbon group having from 1 to 4 carbon atoms, k is an integer of from 1 to 12, l is an integer of from 2 to 6, m is an integer of 1 or 2, n is an integer of 1 or 2 provided that $m+n \leq 3$.

6 Claims, No Drawings

MAGNETIC RECORDING MEDIUM HAVING A BACK COAT LAYER CONTAINING A SPECIFIC TYPE OF LUBRICANT

BACKGROUND OF THE INVENTION

1. Field of the Invention

This invention relates to magnetic recording mediums such as magnetic tapes, magnetic disks and the like and more particularly, to back-coated magnetic recording mediums having a specific type of lubricant in the back coat layer.

2. Description of the Prior Art

Recently, home video tape recorders have been widely in use. Magnetic tapes used for these recorders are run while contacting, under tension, a number of guide pins in a loading mechanism of the recorder.

In order to improve the runnability of the magnetic tape or to reduce a coefficient of friction of the magnetic tape, there has been proposed formation of a back coat layer such as described in, for example, Japanese Laid-open patent application Nos. 52-73703, 58-41420 and 59-5428.

More particularly, a magnetic recording layer is formed on one side of a non-magnetic support and a back coat layer is formed on the opposite side. The back coat layer is made of a composition which comprises a fluorine-modified silicone oil, carbon black and barium sulfate. However, this type of back coat layer is not satisfactory particularly with respect to the runnability for rewinding at low temperatures.

SUMMARY OF THE INVENTION

It is accordingly an object of the invention to provide a magnetic recording medium having a back coat layer whose runnability at low temperatures is significantly improved over prior art counterparts by the presence of a specific type of lubricating compound in the layer.

It is another object of the invention to provide a magnetic recording medium which has a back coat layer containing a specific type of fluorine-modified organosiloxane whereby a coefficient of dynamic friction becomes small with the coefficient increasing only in a slight degree after repetition of running operations of the medium.

It is a further object of the invention to provide a magnetic recording medium which ensures a stable running operation and rarely involves defects on the surface of a back coat layer or jitter, permitting good recording and reproducing characteristics to be imparted to the medium.

The above objects can be achieved, according to the invention, by a magnetic recording medium which comprises a non-magnetic support, and a magnetic recording layer formed on one side of the support, and a back coat layer formed on the other side of the support. The back coat layer is made of a composition which comprises a resin binder and a compound of the following formula (A) dispersed in the resin binder

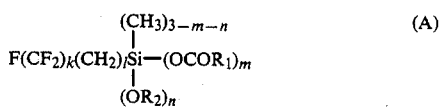

in which $R_1$ represents a saturated or unsaturated monohydrocarbon group having from 7 to 21 carbon atoms, $R_2$ represents a saturated monohydrocarbon group having from 1 to 4 carbon atoms, k is an integer of from 1 to 12, l is an integer of from 2 to 6, m is an integer of 1 or 2, n is an integer of 1 or 2 provided that $m+n \leq 3$.

The back coat layer containing the above compound has good running stability under wide environmental conditions and even at low temperatures.

DETAILED DESCRIPTION AND EMBODIMENTS OF THE INVENTION

The magnetic recording medium according to the invention is characterized by the back coat layer formed on one side of a non-magnetic support which is opposite to a side where a magnetic recording layer is formed. The back coat layer is first described.

The back coat layer is made of a composition which comprises a resin binder and a specific type of fluorine-modified siloxane compound. This compound is represented by the following formula (A)

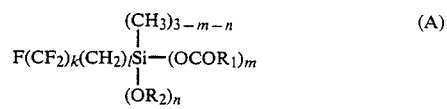

in which $R_1$ represents a saturated or unsaturated monohydrocarbon group having from 7 to 21 carbon atoms, $R_2$ represents a saturated monohydrocarbon group having from 1 to 4 carbon atoms, k is an integer of from 1 to 12, l is an integer of from 2 to 6, m is an integer of 1 or 2, n is an integer of 1 or 2 provided that $m+n \leq 3$.

The aliphatic acid residues represented by $R_1COO$ in the above formula include, for example, saturated aliphatic acid residues such as capryl, decyl, lauryl, myristyl, palmityl, stearyl, behenyl and the like, and unsaturated aliphatic acid residues such as zoomaryl, oleyl, linoleyl, linolenyl, gadoleyl and the like. The saturated monohydrocarbon groups represented by $R_2$ include, for example, a methyl group, an ethyl group, a propyl group, a butyl group, and an isobutyl group.

The compound of the general formula (A) contained in the back coat layer is miscible with various resins because of the presence of the aliphatic groups in the molecule. Typical resins include polyurethanes, polyesters, nitro cellulose, vinyl chloride resins and the like although other various resins as will be described hereinafter with respect to a magnetic recording layer may also be used. The compounds are also advantageous in that they are unlikely to decompose under high temperature and high humidity conditions, ensuring a chemical stability. In addition, the compound has so high a lubricating effect even at low temperatures that the back coat layer can run without troubles upon contact with a number of guide pins in a video tape recording and reproducing apparatus. Thus, the compound exhibits good lubricity over a wide range of from low to high temperatures.

In the formula, if the saturated or unsaturated monohydrocarbon group represented by $R_1$ has less than 6 carbon atoms, inclusive, the lubricity at high temperatures becomes unsatisfactory. On the other hand, when the monohydrocarbon group has not less than 22 carbon atoms, the miscibility with binder resins tends to become poor, with a lowering of lubricity at low temperatures.

When the saturated monohydrocarbon represented by $R_2$ in the formula (A) has 5 or more carbon atoms, the miscibility with a binder resin lowers and the dispersability of the compound becomes poor. Thus, the lubricating properties of the compound cannot be shown effectively. Accordingly, the monohydrocarbon group should have from 1 to 4 carbon atoms.

In the general formula (A), k is an integer of from 1 to 12, l is an integer of from 2 to 6, m is 1 or 2, and n is 1 or 2 provided that $m+n \leq 3$.

If k, l, m and n are each larger than the above defined range, the molecular weight of the compound of the general formula (A) becomes too high. This leads to poor miscibility with and poor dispersability in a binder resin. The lubricating effect of the compound cannot be shown satisfactorily.

A most preferable compound is of the general formula (A) in which $R_1$ is $C_9H_{19}$, $R_2$ is $C_2H_5$, k is 1, l is 3, m is 1 and n is 1.

The compound of the general formula (A) is preferably used in an amount of from 0.5 to 4.5 wt% of a binder resin. Too small an amount is unfavorable because only a small effect is expected. On the other hand, when too large an amount is used, the compound exudes from the surface of the back coat layer and thus blooming is undesirably liable to take place although a great lubricating effect can be attained.

The composition for the back coat layer may further comprise various additives such as carbon black, other types of lubricants, titanium oxide, calcium carbonate and the like in amounts not impeding the effect of the compound of the general formula (A). Of these, carbon black is conveniently added in order for light shielding purposes.

For the formation of the back coat layer, a predetermined amount of the compound of the general formula (A), a binder resin and, if necessary, additives are mixed in a solvent for the binder resin such as in a sand mill. The resulting paint is applied onto a non-magnetic support on a side opposite to a side where a magnetic recording layer is to be formed or has been formed. Subsequently, the applied layer is dried and surface-treated as usual. The back coat layer is usually in a thickness of from 0.5 to 4 micrometers.

The magnetic recording layer may be made of any compositions or metals or their alloys ordinarily used for these purposes. For instance, the recording layer may be made of a ferromagnetic composition which comprises a ferromagnetic powder uniformly dispersed in a resin binder. The ferromagnetic powder may be any magnetic powders ordinarily used in this art and include, for example, ferromagnetic iron oxides such as gamma-$Fe_2O_3$ and $Fe_3O_4$ with or without being deposited with Co, Ni, Mn and the like, ferromagnetic metals such as Co, Ni, Fe and alloys thereof such as Fe—Co, Fe—Ni, Co—Ni, Fe—Co—Ni, and other ferromagnetic materials such as $CrO_2$, barium ferrite and the like.

The binders for this composition may be any known thermoplastic resins, thermosetting resins and mixtures thereof. Typical thermoplastic resins include; vinyl chloride copolymers such as vinyl chloride-vinyl acetate copolymers, vinyl chloride-vinylidene chloride copolymers, vinyl chloride-acrylonitrile copolymers, vinyl chloride-vinyl acetate-vinyl alcohol terpolymers and the like; other copolymers such a acrylic ester-vinylidene chloride copolymers, acrylic ester-styrene copolymers, methacrylic ester-acrylonitrile copolymers, methacrylic ester-vinylidene chloride copolymers and the like; and urethane elastomers, polyvinyl fluoride resins, cellulose derivatives such as cellulose acetate, cellulose propionate, nitro cellulose and the like, amino resins and various other synthetic resins. Examples of thermosetting resins include phenolic resins, epoxy resins, polyurethane resins, urea resins, melamine resins, alkyd resins, silicone resins, acrylic resins, isocyanate prepolymers and other various thermosetting resins.

Alternatively, the magnetic recording layer may be a layer of a ferromagnetic metal or a ferromagnetic metal alloy vacuum deposited on the support. Such metals and alloys may be, for example, Co, Ni, Fe, Fe—Ni, Fe—Co—Ni and the like. However, any types of known magnetic recording magnetic layers may be used in the practice of the invention and thus, the above-described ferromagnetic powders, binders and metals or alloys should be construed as not limiting the present invention.

Non-magnetic supports may be disks, films, foils or sheets of a variety of materials including, for example, synthetic or semi-synthetic resins such as polyesters, polyimides, polyphenylene sulfides, polyolefins, cellulose derivatives and the like, metals such as aluminum, magnesium, copper and the like, glasses and ceramics.

The present invention is more particularly described by way of examples. Comparative examples are also described.

EXAMPLE 1

First, a magnetic composition of Co—γ—$Fe_2O_3$ dispersed in a vinyl chloride-vinyl alcohol copolymer and a polyurethane resin was formed on one side of a 13 micrometer thick polyester film, dried, calendered as usual, thereby forming a magnetic recording layer on this side.

Two parts by weight of a compound of the general formula (A) in which $R_1$ is $C_9H_{19}$, $R_2$ is $C_2H_5$, k is 1, l is 3, m is 1 and n is 1, 100 parts by weight of carbon black having a specific surface area of 300 $m^2/g$ and a DBP oil absorption of 125 ml, 50 parts by weight of nitro cellulose, 50 parts by weight of polyurethane, 2 parts by weight of a fatty acid ester, and 450 parts by weight of a mixed solvent of methyl ethyl ketone, methyl isobutyl ketone and toluene in equal amounts were mixed and dispersed sufficiently in a sand mill. Thereafter, 30 parts by weight of a polyisocyanate curing agent was further added to the mixture, thereby obtaining an abrasive-free paint. This non-magnetic paint was applied onto the other side of the non-magnetic support where any magnetic layer had not been formed, followed by drying and calendering to form an about 0.8 to 1.5 micrometer thick back coat layer. Thus, a magnetic recording tape of the invention could be obtained.

EXAMPLE 2

The general procedure of Example 1 was repeated using 3 parts by weight of the compound of the general formula (A), thereby obtaining a magnetic recording tape.

EXAMPLE 3

The general procedure of Example 1 was repeated except that 40 parts by weight of the nitro cellulose and 60 parts by weight of the polyurethane were used, respectively, thereby obtaining a magnetic recording tape.

COMPARATIVE EXAMPLE 1

The general procedure of Example 1 was repeated without use of the compound of the general formula (A), thereby obtaining a magnetic recording tape.

COMPARATIVE EXAMLE 2

The general procedure of Example 1 was repeated using, instead of the compound of the general formula (A), an organosiloxane compound of the following formula

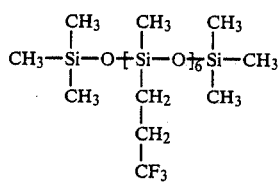

The magnetic recording tapes obtained in these examples and comparative examples were subjected to measurements of an initial coefficient of dynamic friction, a coefficient of dynamic friction after repetition of 500 running cycles, and a degree of defects and a jitter after repetition of 500 running cycles.

The coefficient of dynamic friction, $\mu_k$, was determined as follows: a magnetic tape was wound about a stainless steel pin having a diameter of 6 mm such that the back coat layer was in contact with the pin and was run to measure a tension, $T_1$, at an inlet side with respect to the stainless steel pin and a tension, $T_2$, at an outlet side; and the coefficient was calculated from the following equation using the two tensions, $T_1$ and $T_2$, $$\mu_k = (1/\pi) \ln (T_1/T_2)$$

The degree of defects was determined by visual observation of a tape after repeating 500 running cycles.

The jitter was determined by subjecting each tape to 500 running cycles repeatedly under conditions of a temperature of 40° C. and a humidity of 80% R.H., and fluctuation of a picture was visually observed.

The results are shown in the following table.

TABLE

| | Coefficient of Dynamic Friction | | Degree of Defects | Jitter |
|---|---|---|---|---|
| | Initial | After 500 Running Cycles | | |
| Example: | | | | |
| 1 | 0.24 | 0.25 | nil | no |
| 2 | 0.19 | 0.26 | nil | no |
| 3 | 0.24 | 0.27 | nil | no |
| Comparative Example: | | | | |
| 1 | 0.31 | 0.47 | considerable | fair |
| 2 | 0.25 | 0.42 | considerable | slight |

As will be apparent from the above table, the magnetic tapes of the present invention have a small coefficient of dynamic friction and good runnability. The coefficient of dynamic friction does not increase significantly and is kept substantially constant after the repeated running operations. Thus, the running stability of the tapes of the invention is high. In addition, the back coat layer of the magnetic tapes according to the invention does rarely suffer defects with a very small degree of fluctuation of the picture.

What is claimed is:

1. A magnetic recording medium which comprises a non-magnetic support, a magnetic recording layer formed on one side of the support, and a back coat layer formed on the other side of the support, said back coat layer being made of a composition which comprises a resin binder and a compound of the following formula (A) dispersed, as a lubricant, in the resin binder.

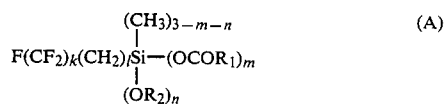

in which $R_1$ represents a saturated or unsaturated monohydrocarbon group having from 7 to 21 carbon atoms, $R_2$ represents a saturated monohydrocarbon group having from 1 to 4 carbon atoms, k is an integer of from 1 to 12, l is an integer of from 2 to 6, m is an integer of 1 or 2, and n is an integer of 1 or 2 provided that $m+n \leq 3$.

2. A magnetic recording medium according to claim 1, wherein said compound is used in an amount of from 0.5 to 4.5 wt% based on the resin binder.

3. A magnetic recording medium according to claim 1, wherein in the general formula, $R_1$ is $C_9H_{19}$, $R_2$ is $C_2H_5$, k is 1, l is 3, m is 1 and n is 1.

4. A magnetic recording medium according to claim 1, wherein said back coat layer has a thickness of from 0.5 to 4 micrometers.

5. A magnetic recording medium according to claim 1, wherein said resin binder is polyurethane.

6. A magnetic recording medium according to claim 1, further comprising carbon black for light shielding.

* * * * *